(12) United States Patent
Pettit

(10) Patent No.: US 6,445,933 B1
(45) Date of Patent: Sep. 3, 2002

(54) TELE-REMOTE TELEPHONE AND REMOTE CONTROL DEVICE

(76) Inventor: Tim Pettit, P.O. Box 680004, Fort Payne, AL (US) 35968-1601

( * ) Notice: Subject to any disclaimer, the term of this patent is extended or adjusted under 35 U.S.C. 154(b) by 192 days.

(21) Appl. No.: 09/617,786

(22) Filed: Jul. 17, 2000

(51) Int. Cl.[7] ................................................. H04B 1/38
(52) U.S. Cl. .......................... 455/556; 455/550; 455/90
(58) Field of Search ................................ 455/556, 344, 455/550, 420, 90; 379/56, 61, 93, 96; 345/168, 169, 170; 348/14, 15, 176

(56) References Cited

U.S. PATENT DOCUMENTS

| | | | | |
|---|---|---|---|---|
| 5,138,649 A | * | 8/1992 | Krisgergh et al. | 379/56 |
| 5,657,370 A | * | 8/1997 | Tsugane et al. | 455/550 |
| 5,671,267 A | * | 9/1997 | August et al. | 379/61 |
| 5,802,460 A | * | 9/1998 | Parvulescu et al. | 455/92 |
| 5,892,500 A | * | 4/1999 | Kang et al. | 345/157 |
| 5,901,366 A | * | 5/1999 | Nakano et al. | 455/575 |
| 5,963,624 A | * | 10/1999 | Pope | 379/110.01 |
| 6,186,630 B1 | * | 2/2001 | Miyashita | 353/42 |
| 6,292,210 B1 | * | 9/2001 | Gerszberg et al. | 348/14.01 |

FOREIGN PATENT DOCUMENTS

| | | | | |
|---|---|---|---|---|
| JP | 05-153270 | * | 6/1993 | H04M/11/00 |
| JP | 08079339 A | * | 3/1996 | H04M/1/00 |
| JP | 11122163 A | * | 4/1999 | H04B/7/26 |
| JP | 2000-125-027 | * | 4/2000 | H04M/11/00 |

* cited by examiner

*Primary Examiner*—Thanh Cong Le
*Assistant Examiner*—Charles Chow
(74) *Attorney, Agent, or Firm*—Rodger H. Flagg

(57) ABSTRACT

A teleremote device includes a cordless or cellular telephone in combination with a remote controller for a television, VCR, satellite receiver, DVD device, and/or video game controller. The telephone and remote control device are provided in a single rechargeable unit. The device includes a telephone keypad on one side of the device, and a remote control keypad on the other side. To avoid accidental or inadvertent actuation of keys on one side of the device while intending use of the other side, a switch control element is provided to permit selective actuation of the telephone keypad or the remote control keypad. An off switch is provided to conserve battery power when the teleremote device is not in use. Indicator lights may also be provided to show which side of the device is actuated.

20 Claims, 2 Drawing Sheets

US 6,445,933 B1

TELE-REMOTE TELEPHONE AND REMOTE CONTROL DEVICE

FIELD OF THE INVENTION

The present invention relates to portable electronics devices including a cordless or cellular telephone, and a remote controller for a television, VCR, satellite receiver, DVD device, and/or video game controller. More particularly, the invention relates to back-to-back portable telephone and a remote control device in a single rechargeable unit. The invention includes a switch control element which selectively actuates either the telephone device or the remote control device, so that only one device is actuated at a time. The switch control element may also include an Off position to conserve battery power when the teleremote device is not in use.

BACKGROUND OF THE INVENTION

There are known in the art separate electronic units such as telephones, cordless telephones, and cellular telephones, as well as control units for VCRs, television sets, cable television control units, DVD players, satellite receivers, and video games, for example.

In U.S. Pat. No. 5,138,649 to Krisbergh et al., a portable telephone handset remote control is shown. In this patent, a remote control and a telephone handset are combined into a single unit for one or more appliances having a common keypad. The appliance control signal is generated in response to the actuation of at least one of the keypad keys and transmitted via an infrared or radio frequency communications link.

U.S. Pat. No. 5,671,267 to August et al. relates to an interactive system for communications between a cordless telephone and a remotely operated device. A portable unit of a cordless telephone provides wireless telephone communications and integrates telephone functions and control of remotely operated devices. The portable unit combines controlling the information provided by a remotely operated device in response to voice and data communications occurring over the telephone network.

U.S. Pat. No. 4,508,935 to Mastromoro teaches a cordless telephone having a remote control function which includes a base unit and a remote unit that are in wireless communication. The remote unit has a number keyboard whereby code numbers can be entered, and a pulse detecting network picks up and identifies the code numbers placed in the remote unit and, in response thereto, controls a variety of electrically responsive devices.

U.S. Pat. No. 4,392,022 to Carlson teaches a television remote control system for selectively controlling a plurality of external devices using a portion of a television receiver system to control appliances external to the television receiver. A specific embodiment is shown for controlling a telephone through a television remote control unit which is used to originate telephone calls to telephone stations.

U.S. Pat. No. 4,899,370 to Kameo et al. teaches a remote control for electronic equipment. It uses a remote telephone set to remotely control a VCR.

U.S. Pat. No. 4,841,562 to Lem teaches a telephone VCR control. It enables programming an existing VCR via standard telephone lines.

However, for a household with such devices as telephones, cordless telephones, and cellular telephones, as well as control units for VCRs, television sets, cable television control units, DVD players, satellite receivers, and video games, for example, the multiplicity of the needed remote control units is inconvenient and entails separate costs for each.

Additionally, each unit requires its own battery power supply as well as its own recharging station if the device includes a rechargeable power source. This adds to clutter and costs, and uses electrical outlet space which is often limited.

SUMMARY OF THE INVENTION

The present invention provides a cordless or cellular telephone device back-to-back with a remote control device for a television, VCR, satellite receiver, DVD device, and/or video game controller. The telephone keypad is located on one side of the device, and a remote control keypad is located on the on the other side of the device. To avoid accidental or inadvertent actuation of keys on one side of the device while intending use of the other side, a switch control element is provided to permit convenient switching between opposite sides of the unit. That is, either the telephone keypad is active, or else the remote control keypad is active, but not both at the same time. Indicator lights can also be provided to show which side of the device is active. The indicator lights can be LED's, for example.

The device shares a single recharging unit in order to eliminate clutter and reduce storage space. The single recharging unit is linked to a single rechargeable battery, which in turn is linked to a separate telephone memory storage for the telephone keypad, and a separate remote control memory storage for the remote control keypad, so that memory is not lost when the switch control element is selectively actuated.

Other objects and advantages of the present invention will be more readily apparent from the following detailed description when read in conjunction with the accompanying drawings.

DETAILED DESCRIPTION OF THE INVENTION

Figure 1:
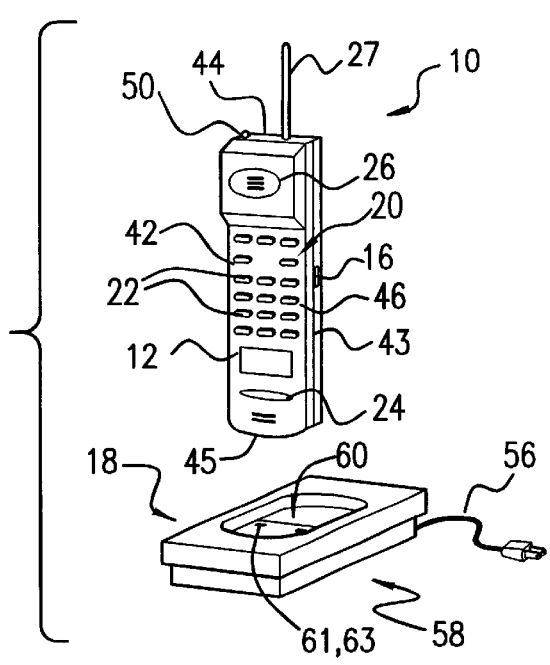
FIG. 1 is a perspective assembly view of a portable teleremote device and recharging base, showing a telephone keypad side of the device according to the present invention.
Figure 2:
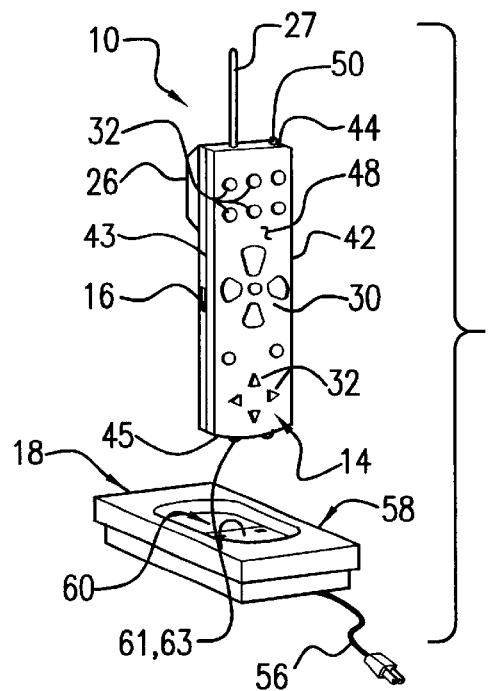
FIG. 2 is a perspective assembly view of the portable teleremote device and recharging base of FIG. 1, showing an opposite side of the portable teleremote device having keys and buttons for a conventional remote control unit.
Figure 3:
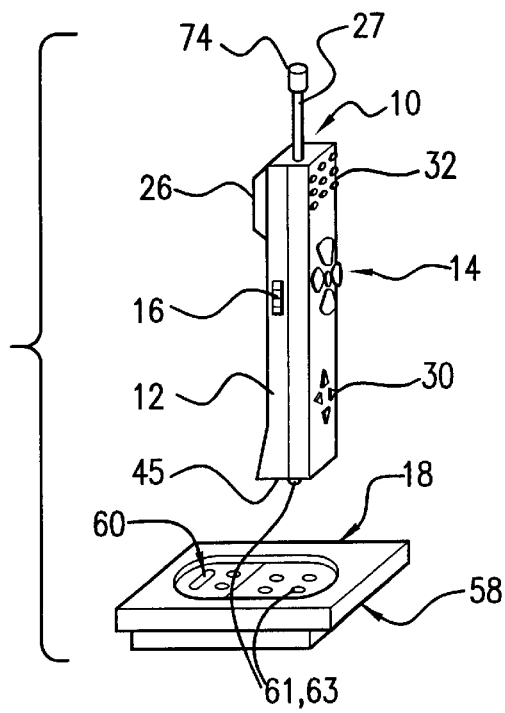
FIG. 3 is a side view, also in perspective, of the portable teleremote device of FIGS. 1 and 2, showing a switch control element used according to the present invention.

FIG. 1 through FIG. 3 show in perspective, an assembly of a portable teleremote device 10 having a telephone device 12 on one side 46, back to back with a remote control device 14 on the opposite side 48. The portable teleremote device 10 further has a switch control element 16 for selectively actuating either the telephone device 12 or the remote control device 14. The switch control element 16 may also include an off position 66, wherein neither the telephone device 12 nor the remote control device 14 are actuated.

A recharging base unit 18 is provided to receive the portable teleremote unit 10 to reduce the horizontal table space required to store the portable teleremote device 10, while recharging the battery power supply 19 located within the teleremote device 10.

As shown in FIG. 1, the portable teleremote device 10 has a telephone keypad 20 having a plurality of telephone actuation keys 22 configured in a convenient format, for ease of use. Preferably, the telephone actuation keys 22 are configured in a manner common to conventional telephone keypads 20, for user familiarity and convenience The telephone actuation keys 22 may be illuminated (not shown) when the switch control element 16 is selectively positioned to actuate the telephone device 12.

Likewise, as shown in FIG. 2, the portable teleremote device 10 has a remote control keypad 30 positioned on the side 48 opposite the telephone keypad 20. The remote control keypad 30 has a plurality of remote control keys 32 configured in a convenient format, for ease of use. Preferably, the remote control actuation keys 32 are configured in a manner common to conventional remote control keypads 30, for user familiarity and convenience. The remote control keys 32 may serve as a remote controller for a television, a VCR, a satellite receiver, a DVD device, and/or a video game, among other possible remote control functions. Preferably, the format of the remote control keys 32 is similar in position, function and design to those currently in use in the industry. The remote control keys 32 may be illuminated (not shown) when the switch control element 16 is selectively positioned to actuate the remote control device 14.

The telephone keypad 20, shown in FIG. 1, includes a plurality of telephone actuation keys 22, a microphone portion 24 for picking up sounds, a speaker portion 26 for reproducing sounds, and an antenna 27 for communicating with a remote base. The telephone keypad 20 renders the teleremote device 10 capable of functioning, for example, as a cordless telephone. Alternatively, the telephone functions and electronics in the portable teleremote device 10 could be those of a cellular or PCS telephone, for example, or a two-way radio, or other device for two-way remote telecommunications, and all such embodiments and functions are contemplated as being within the scope of the present invention. Preferably, the format of the telephone actuation keys 22 is similar in position, function and design to those currently in use in the industry.

Figure 4:
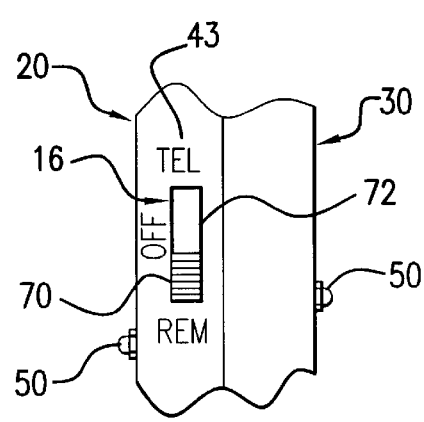
FIG. 4 is a partial side view, enlarged for the sake of clarity, of the switch control element shown in FIG. 3, showing a telephone switch actuation position, an off position, and a remote control actuation position.

The portable teleremote device 10 shown in FIG. 4 includes a switch control element 16 for selectively actuating either the telephone keypad 20 or the remote control keypad 30. To avoid accidental or inadvertent actuation of telephone actuation keys 22 or the remote control actuation keys 32 located on opposite sides of the portable teleremote device 10, the switch control element 16 actuates only one side at a time. The switch control element may be conveniently located on either the left side 42, the right side 43, the top side 44, the bottom side 45, or on the telephone keypad side 46, or the remote control keypad side 48 of the teleremote device 10. A suitable LED (light emitting diode) 50 may be used to indicate the actuation of either the telephone keypad 20 or the remote control keypad 30.

The switch control element 16 provides convenient selective switching so that either the telephone keypad 20 is active, or the remote control keypad 30 is active. This eliminates the problem of inadvertantly actuating remote control keys 32 while using the telephone keypad 20, as the user's hand typically grasps the teleremote device 10 on both the telephone keypad side 46 and the remote control keypad side 48 during handling and use. Likewise, the switch control element 16 eliminates the problem of inadvertantly actuating telephone actuation keys 22, when using the remote control keypad 30. An off position may also be provided to deactivate both the telephone keypad 20 and the remote control keypad 30, when not in use, to better conserve power from the battery power supply 19.

Figure 5:
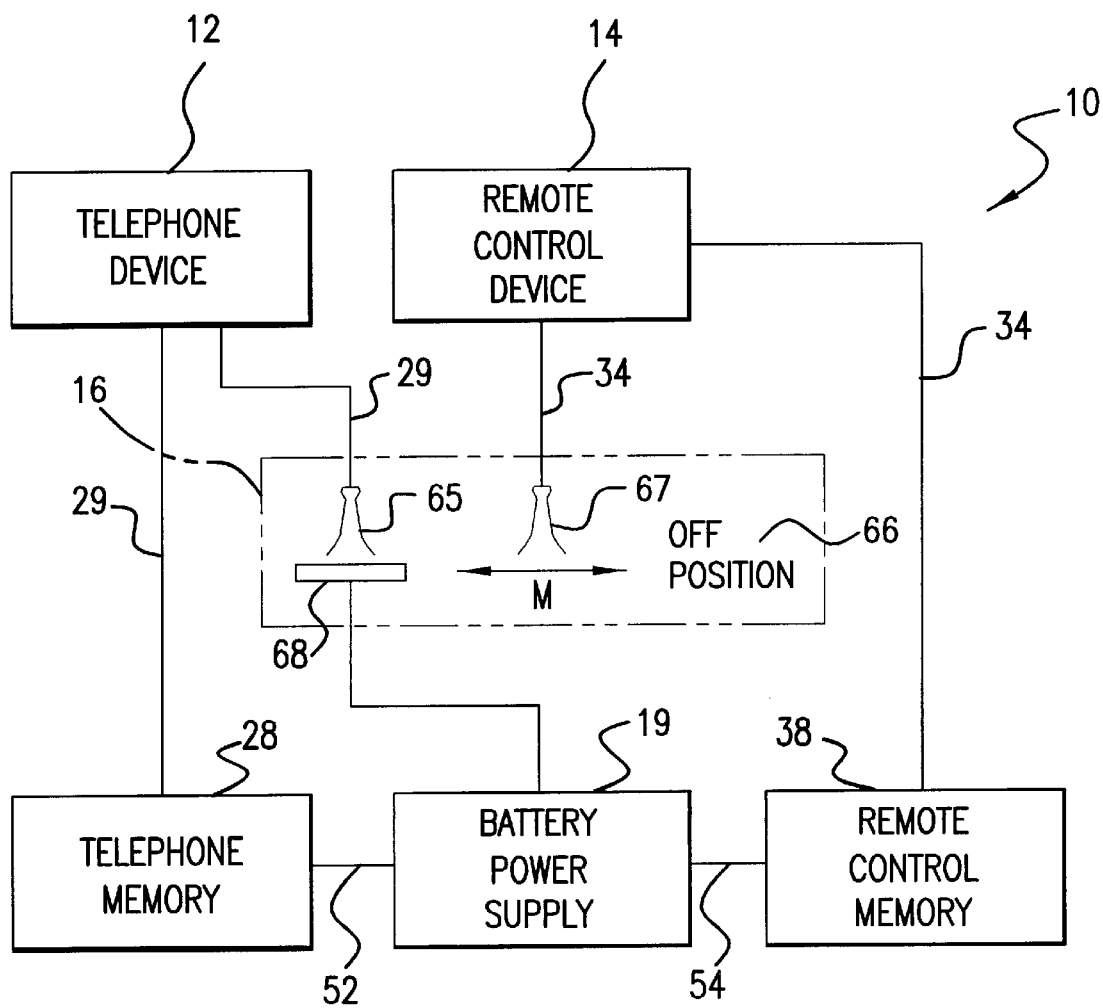
FIG. 5 is a schematic circuit diagram showing circuit elements selectively connected by the switch control element of FIG. 4. Note that the rechargeable battery maintains the telephone memory storage and the remote control memory storage regardless of the selective actuation of the switch control element.

FIG. 5 is a block diagram showing the relationship of the telephone keypad 20, the remote control keypad 30, the switch control element 16, the battery power supply 19, the telephone memory device 28 and the remote control memory device 38. Note that the telephone memory device 28 is connected directly to the battery power supply 19 via electronic circuitry 52, so that pre-programmed memory to the telephone device 12 will not be lost when the switch control element 16 is actuated to an alternate, or off position.

Likewise, the remote control memory 38 is connected directly to the battery power supply 19 via electronic circuitry 54, so that pre-programmed memory to the remote control device 14 will not be lost when the switch control element 16 is actuated to an alternate, or off position.

When the telephone keypad 20 is actuated, the switch control element 16 passes power from the battery power supply 19 to the electronic telephone circuitry 29, which actuates the telephone keypad 20, enabling the user to utilize the telephone device 12 in a manner well known in the art. The telephone memory 28 may be accessed by the telephone keypad 20 to provide redial features, recall preprogrammed telephone numbers, provide voice mail, call forwarding, as well as other known telephone memory functions.

Likewise, the remote control memory device 30 may be accessed by the remote control keypad 30 to provide program features such as recording, timing and program functions which are well known in the art, and in common use on other remote control devices. As previously noted, the remote control keypad 32 is of a size and configuration common to other remote control devices, for ease of use.

The recharging base unit 18 shown in FIG. 1 includes a power cord 56, a base portion 58, and an electrical connection portion 60, preferably including complimentary male and female portions 61, 63 for connecting the portable teleremote device 10 to the recharging base unit 18. The electrical connection portion 60, when receiving the bottom side 45 of the portable teleremote device 10, electrically connects a rechargeable battery power supply 19 (shown in FIG. 5) within the portable teleremote device 10 with an external source of power (not shown) such as a conventional electrical outlet.

As shown in FIG. 2, the remote control keypad side 48 of the portable teleremote device 10 includes a remote control keypad 32 having various typical kinds of remote control functions, for example to serve as a remote controller for a television, a VCR, a satellite receiver, a DVD device, and/or a video game, among other possible remote control functions. Such functions are well known in the remote control arts, and all such remote control features are contemplated as being within the scope of the present invention. FIG. 3 is a side view, also in perspective, of the portable teleremote device 10 of FIGS. 1 and 2, showing the switch control element 16 positioned on the right side 43. It should be noted that the switch control element 16 may be alternately positioned on the left side 42, the top side 44, the bottom side 45, the telephone keypad side 46, or the remote control keypad side 48, without departing from the scope of this disclosure, nor from the accompanying claims.

FIG. 4 is a partial view, enlarged for the sake of clarity, of a first embodiment of the switch control element 16. As shown in FIG. 4, the switch control element 16 is a manually actuable slide switch having a slide element 70 which slides within a recess 72. Markings, such as TEL, OFF and REM are provided to indicate the positions of the switch switch control element 16, namely whether the switch actuates the telephone keypad side 46 (TEL), is positioned in the OFF position, or is positioned to actuate the remote control keypad side 48 (REM). The OFF position is optional, as the telephone keypad side may be left on to receive calls, while the remote control device is not being actively used.

The provision of a slide switch function and structure for the switch control element 16 is merely exemplary, and other types of switches are contemplated as being usable with the present invention, such as toggle switches, button switches, etc. Such switches are well known in the switching arts and electrical circuit arts, and any such switches are contemplated as being within the scope of the present invention.

FIG. 5 is a schematic circuit diagram showing various circuit elements of the portable teleremote device 10 which are selectively connected by the switch control element 16. The portable teleremote device 10 includes a battery power supply 19 which is selectively connectable via the switch control element 16 to the electronic telephone circuitry 29 or to the electronic remote control circuitry 34 which is, for example, any combination of TV, VCR, DVD, satellite, or cable controller circuitry known in the art. The switch control element 16 is shown in FIG. 5 as having brush or slider electrical contacts 65. 67, and a conductive portion of the slide element 68 which is always in electrical contact with the battery power. supply 19, and which is movable in the direction shown by the double-headed arrow M to selectively contact either the electrical contact 65, an Off position 66, or the electrical contact 67. Other electrical arrangements could also be used, including other known electronic switch apparatus (not shown). All such known switch structures are contemplated as being within the scope of the present invention.

FIG. 4 also shows indicator lights 50 on the opposite sides 46, 48 of the portable teleremote device 10, respectively. The indicator lights 50 can, for example, be LED's, or can be small incandescent lamps. As discussed above, the indicator lights 50 are used to show which side of the portable electronic control unit 10 is active, for ease of use.

Other forms of visual or audible indication may be used to identify selective actuation of the telephone device 12 or the remote control device 14, without departing from the scope of this disclosure, or from the following claims.

The antenna 27 may be used to send or receive a signal between the teleremote device and either the remote control device 14 or the telephone device 12. A sensor light 74 may be placed upon the distal end of the antenna 27, as shown in FIG. 3, when the teleremote device 10 is operational. The invention being thus described, it will be evident that the same may be varied in. many ways. Such variations are not to be regarded as a departure from the spirit and scope of the invention and all such modifications are intended to be included within the scope of the claims.

Parts List

Teleremote Device

10—Teleremote device
12—telephone device
14—remote control device
16—switch control element
18—recharging base unit
19—battery power supply
20—telephone key pad
22—telephone actuation keys
24—microphone portion
26—speaker portion
27—antenna
28—telephone memory storage
29—electronic telephone circuitry
30—remote control keyboard
32—remote control actuation keys
34—electronic remote control circuitry
38—remote control memory storage
42—left side
43—right side
44—top side
45—bottom side
46—telephone keypad side
48—remote control keypad side
50—LED
52—memory circuitry to telephone
54—memory circuitry to remote control
56—power cord
58—base portion
60—electrical connection portion
61—male connector
63—female connector
65—electrical contact to telephone
66—off position
67—electrical contact to remote control
68—conductive portion
70—slide element
72—recess
74—sensor device

I claim:

1. A combination telephone apparatus and a remote control apparatus in a single housing combined to form a portable teleremote apparatus, which comprises:

a) the housing having a front portion, a back portion, a top portion, a bottom portion, a first side portion and a second side portion;

b) the telephone apparatus located within the housing, with a telephone keypad having a plurality of selectable telephone actuation keys located on the front portion of the housing; the telephone apparatus in electrical communication with a telephone memory located within the housing when the telephone apparatus is selectively actuated, the telephone apparatus further having a microphone portion for picking up sounds, a speaker portion for reproducing sounds, and an antenna extending from the housing for remote communication with a remote telephone base;

c) the remote control apparatus located within the housing, with a remote control keypad having a plurality of selectable remote control actuation keys located on the back portion of the housing, the remote control apparatus in electrical communication with a remote control memory located within the housing when the remote control apparatus is selectively actuated, the remote control apparatus further having a transmitting and receiving means and an antenna in remote communication with a remote control base;

d) a battery power supply located within the housing, the battery power supply in electrical communication with the telephone memory, the remote control memory; and a switch control element;

e) the switch control element mounted on the housing for selectively directing power from the battery power supply to a selected one of the telephone apparatus, and the remote control apparatus; and f) a rechargeable base unit adapted to provide electrical communication between the rechargeable base unit and the battery power supply located within the housing, when the housing is in electrical communication with the rechargeable base unit, and the rechargeable base unit is in electrical communication with a remote power supply.

2. The portable teleremote apparatus of claim 1, wherein the switch control element includes multiple switch positions, including a telephone actuation position, an off switch position, and a remote control apparatus position, with a manual actuator positioned upon the housing to selectively actuate a selected one of the multiple switch positions.

3. The portable teleremote apparatus of claim 1, wherein at least one telephone actuation key located on the telephone keypad is illuminated when the switch control element is selectively positioned to actuate the telephone keypad, and at least one remote control actuation key located on the remote control keypad is illuminated when the switch control element is selectively positioned to actuate the remote control keypad.

4. The portable teleremote apparatus of claim 1, wherein a visual indicator is mounted on the distal end of the antenna to signal actuation of at least one of the telephone apparatus and the remote control apparatus.

5. The portable teleremote apparatus of claim 4, wherein said visual indicator is a first light emitting diode located on the housing adjacent to the telephone keypad, and a second light emitting diode is located on the housing adjacent to the remote control keypad.

6. The portable teleremote apparatus of claim 1, wherein the telephone keypad is similar in layout and actuation to a conventional telephone keypad.

7. The portable teleremote apparatus of claim 1, wherein the remote control keypad is similar in layout and actuation to a conventional remote control keypad.

8. The portable teleremote apparatus of claim 1, wherein the telephone memory is selectively accessed by the telephone keypad to provide at least one of: redial, recall of pre-programmed telephone numbers, voice mail, and call forwarding.

9. The portable teleremote apparatus of claims, wherein the remote control memory is selectively accessed by the remote control keypad to provide at least one of: storing data on the remote control memory and selecting data from the remote control memory.

10. The portable teleremote apparatus of claim 1, wherein the remote control keypad is adapted to selectively control at least one of: a television, a VCR, a satellite receiver, a DVD device, and a video game.

11. A combination telephone apparatus and a remote control apparatus in a single housing combined to form a portable teleremote apparatus, which comprises:

a) the housing having a front portion, a back portion, a top portion, a bottom portion, a first side portion and a second side portion;

b) the telephone apparatus located within the housing, with a telephone keypad having a plurality of selectable telephone actuation keys located on the front portion of the housing; the telephone apparatus in electrical communication with a telephone memory located within the housing when the telephone apparatus is selectively actuated, the telephone apparatus further having a microphone portion for picking up sounds, a speaker portion for reproducing sounds, and an antenna extending from the housing for remote communication with a remote telephone base;

c) the remote control apparatus located within the housing, with a remote control keypad having a plurality of selectable remote control actuation keys located on the back portion of the housing, the remote control apparatus in electrical communication with a remote control memory located within the housing when the remote control apparatus is selectively actuated, the remote control apparatus further having a transmitting and receiving means and an antenna in remote communication with a remote control base;

d) a battery power supply located within the housing, the battery power supply in electrical communication with the telephone memory, the remote control memory; and a switch control element;

e) the switch control element mounted on the housing for selectively directing power from the battery power supply to one of a plurality of switch control positions, the switch control positions including a switch position connecting the battery power supply to the telephone apparatus, to an off position, and connecting the battery power supply to the remote control apparatus; and f) a rechargeable base unit adapted to provide electrical communication between the rechargeable base unit and the battery power supply located within the housing, when the housing is in electrical communication with the rechargeable base unit, and when the rechargeable base unit is in electrical communication with a remote power supply.

12. The portable teleremote apparatus of claim 11, wherein at least one telephone actuation key located on the telephone keypad is illuminated when the switch control element is selectively positioned to actuate the telephone keypad, and at least one remote control actuation key located on the remote control keypad is illuminated when the switch control element is selectively positioned to actuate the remote control keypad.

13. The portable teleremote apparatus of claim 11, wherein a first light emitting diode is located on the housing adjacent to the telephone keypad, and a second light emitting diode is located on the housing adjacent to the remote control keypad, and the first light emitting diodes is actuated upon selective actuation of the telephone apparatus, and the second light emitting diode is actuated upon selective actuation of the remote control apparatus.

14. The portable teleremote apparatus of claim 11, wherein the telephone keypad is similar in position, layout and function to a conventional telephone keypad.

15. The portable teleremote apparatus of claim 11, wherein the remote control keypad is similar in position, layout and function to a conventional remote control keypad.

16. The portable teleremote apparatus of claim 11, wherein the telephone memory is accessed by the telephone keypad to provide at least one of: redial, recall preprogrammed telephone numbers, voice mail, and call forwarding.

17. The portable teleremote apparatus of claim 11, wherein the remote control memory is accessed by the remote control keypad to provide at least one of: programming the remote control memory and selecting preprogramming data from the remote control memory.

18. The portable teleremote apparatus of claim 11, wherein the remote control keypad is adapted to selectively control at least one of: a television, a VCR, a satellite receiver, a DVD device, and a video game.

19. A combination telephone apparatus and a remote control apparatus in a single housing, combined to form a portable teleremote apparatus, which comprises:

a) the housing having a front portion, a back portion, a top portion, a bottom portion, a first side portion and a second side portion;

b) the telephone apparatus located within the housing, with a telephone keypad having a plurality of selectable telephone actuation keys located on the front portion of the housing; the telephone apparatus in electrical communication with a telephone memory located within the housing when the telephone apparatus is selectively actuated, the telephone apparatus further having a microphone portion for picking up sounds, a speaker portion for reproducing sounds, and an antenna extending from the housing for remote communication with a remote telephone base;

c) the remote control apparatus located within the housing, with a remote control keypad having a plurality of selectable remote control actuation keys located on the back portion of the housing, the remote control apparatus in electrical communication with a remote control memory located within the housing when the remote control apparatus is selectively actuated, the remote control apparatus further having a transmitting and receiving means and an antenna in remote communication with a remote control base;

d) a battery power supply located within the housing, the battery power supply in electrical communication with the telephone memory, the remote control memory; and a switch control element;

e) the switch control element mounted on the housing for selectively directing power from the battery power supply to one of a plurality of switch control positions, the switch control positions including a switch position connecting the battery power supply to the telephone apparatus, to an off position, and to the remote control apparatus;

f) at least one telephone actuation key located on the telephone keypad is illuminated when the switch control element is positioned to connect the battery power supply to the telephone apparatus, and at least one remote control actuation key located on the remote control keypad is illuminated when the switch control element is positioned to connect the battery power supply to the remote control apparatus; and g) a rechargeable base unit adapted to provide electrical communication between the rechargeable base unit and the battery power supply located within the housing, when the housing is in electrical communication with the rechargeable base unit, and when the rechargeable base unit is in electrical communication with a remote power supply.

20. The portable teleremote apparatus of claim 19, wherein a single antenna extending from the housing is selectively actuated for remote communication with a remote telephone base, and for remote communication with a remote control base.

* * * * *